United States Patent [19]

Schwenninger

[11] 4,311,508

[45] Jan. 19, 1982

[54] FLOAT GLASS FORMING CHAMBER WITH CAST ROOF

[75] Inventor: Ronald L. Schwenninger, Ridgeley, W. Va.

[73] Assignee: PPG Industries, Inc., Pittsburgh, Pa.

[21] Appl. No.: 195,282

[22] Filed: Oct. 8, 1980

[51] Int. Cl.³ .............................................. C03B 18/16
[52] U.S. Cl. .................................. 65/182.5; 65/182.3; 65/346
[58] Field of Search .................. 65/182.1, 182.3, 182.4, 65/18.25, 346

[56] References Cited

U.S. PATENT DOCUMENTS

| | | | |
|---|---|---|---|
| 2,707,353 | 5/1955 | Honiss | 65/346 |
| 3,183,865 | 5/1965 | Ross | 65/346 UX |
| 3,248,203 | 4/1966 | Cunningham | 65/346 |
| 3,584,477 | 6/1971 | Hainsfurther | 65/182.5 |
| 3,652,250 | 3/1972 | Brichard | 65/182.5 |

*Primary Examiner*—Arthur D. Kellogg
*Attorney, Agent, or Firm*—Dennis G. Millman

[57] ABSTRACT

A float glass forming chamber roof fabricated by casting refractory material about an array of anchor elements presents an interior surface having large, planar, uninterrupted areas, whereby drippage from the roof is reduced.

7 Claims, 5 Drawing Figures

FLOAT GLASS FORMING CHAMBER WITH CAST ROOF

BACKGROUND OF THE INVENTION

In the float process for forming flat glass, molten glass is drawn from a melting furnace and passed to a forming chamber (or "float bath") where the molten glass is deposited onto an elongated pool of molten metal such as tin or copper or alloys thereof. There, a ribbon of glass is stretched to the desired thickness as it progresses along the elongated pool of molten metal and is then withdrawn from the forming chamber as a continuous ribbon at the exit end of the forming chamber. Because of the fluid support provided by the molten metal to the glass, glass of superior optical quality can be produced by the float process.

Unfortunately, a float glass forming chamber is not free from distortion producing effects. One such effect is the "drip" problem which is caused by dripping of molten droplets of metal or compounds thereof from the roof of the forming chamber onto the glass ribbon. Although the atmosphere within the float forming chamber is usually positively pressurized with an inert or reducing gas atmosphere, sulfur and oxygen are introduced into the chamber from the glass ribbon and from other sources and these combine with the metal of the molten metal bath to form sulfides and oxides (e.g., tin sulfide and tin oxide) which volatilize and condense on relatively cool portions of the interior surface of the float chamber. The condensation accumulates on the structural members of the bath interior, and under certain temperature and chemical conditions will be reduced to elemental metal (tin), which eventually falls as droplets onto the glass ribbon. The impact of the metallic droplets on the soft glass ribbon produces indentations which appear as optical distortions in the final glass product. This defect is known variously as "tin drip," "crater drip," "top drop," or "tin speck."

It has now been found that the drippage problem is aggravated by the roof configuration conventionally employed in float forming chambers. The roof design commonly in use comprises a complex grid of relatively small ceramic pieces interlocked with one another and suspended from above by a large number of metallic rods. The design includes a large number of vertically extending electrical heating units supported within openings in the grid. Other openings in the grid are filled with blind plugs. The result is an interior roof surface which is non-planar and has a relatively large surface area and a large number of joints and vertically extending cracks and surfaces. Such a complex roof structure encourages condensation and dripping of volatilization products. The large number of crevices permits ingress of cooler exterior atmosphere which promotes condensation. The non-planar surfaces tend to increase running and coalescing of condensation products. More recent designs of float bath roofs have simplified the support grid design so as to extend across the float chamber in only the transverse direction for the sake of simplified construction. However, the revised design still possesses the drawbacks of a large number of joints and non-planar interior surfaces.

SUMMARY OF THE INVENTION

In the present invention, the roof of a float glass forming chamber is nearly monolithic, with a nearly planar, horizontal, interior surface, thereby discouraging the formation and dripping of condensed volatiles from the roof onto the glass ribbon. This is achieved by casting the roof around a plurality of preformed anchors which are supported from above. While the castable refractory material is setting, the roof may be supported by a temporary form structure of wood or metal. Compared to the conventional float chamber roof made of a large number of interlocking preformed ceramic pieces, the present invention may reduce the total length of cracks in the roof by an order of magnitude or more. Additionally, substantial portions of the interior surface of the chamber can be continuous, uninterrupted, horizontal, planar surfaces. Both of these features substantially reduce the sources of drippage.

The Drawings

DETAILED DESCRIPTION

Figures 1A, 1B:
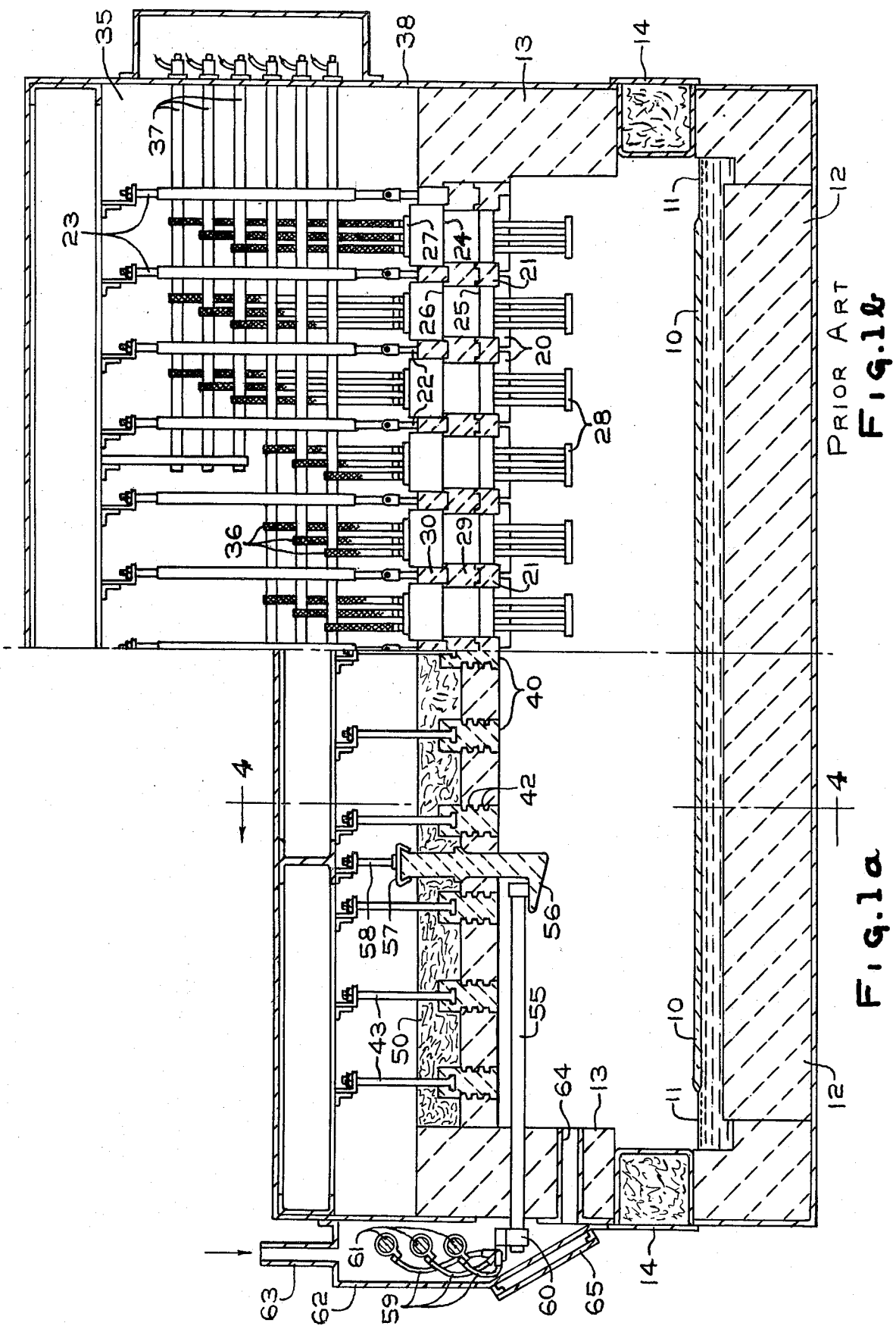
FIG. 1a is a transverse cross-sectional view of a preferred embodiment of a float glass forming chamber in accordance with the present invention.
FIG. 1b is a transverse cross-sectional view of a conventional prior art float glass forming chamber shown for comparison.

In FIG. 1a and FIG. 1b there is shown, side-by-side for comparison, float bath roof designs in accordance with a preferred embodiment of the present invention (FIG. 1a) and the conventional prior art float bath roof (FIG. 1b). In both, a ribbon of glass 10 being attenuated to the desired thickness floats on a pool of molten metal 11 (usually tin, although copper or mixtures of tin and copper may also be employed). Minor amounts of other metals such as iron may also be included in the molten metal bath. The metal bath is contained within a refractory vessel comprising a bottom 12 and side walls 13 having access openings that may be closed by means of side seals 14.

In the prior art roof arrangement as shown in FIG. 1b, the basic support grid comprises a large number of transversely extending support members 20 and longitudinally extending support members 21, both of which are performed ceramic pieces. Vertically extending hanger rods 22 have hook-like members at their lower ends (not shown) which engage and interlock the ends of adjacent transverse support members 20. The longitudinal support members 21 span adjacent rows of the transverse support members 20 upon which they rest at opposite ends. The hanger rods 22 are, in turn, supported from above by rods 23 fastened at their upper ends to the overhead superstructure. The spacing between adjacent hanger rods both transversely and longitudinally in such a system is typically on the order of 30 centimeters or less. Into the rectangular openings in this grid are inserted a large number of heater elements, each of which consists of a sandwich of a plurality of pieces of refractory material 24, 25, 26, and 27 fastened together by means of vertically extending tie rods (not shown) and a vertically extending three-legged electrical resistance heating element 28 passing through the refractory pieces. The bottom refractory member 25 of the composite heating element overlaps and rests upon adjacent transverse support members 20. The spaces between the heating elements are filled with additional refractory members 29 and 30 which rest on the longitudinal support members 21 between the hangers 22. Heater elements are shown inserted into each of the grid openings in FIG. 1b as is the case in some zones of a conventional float chamber, but in other zones a particular cross-section may have some or even all of the openings filled with blind plugs rather than heater elements.

The prior art arrangement as shown in FIG. 1b employs a relatively large upper plenum chamber 35 to accommodate electrical connections to the heater elements. Each leg of the resistance heater elements 28 is connected at its upper end to a lead 36 which is, in turn, connected to a bus bar 37 in a three phase alternating current system. Because the float chamber is usually provided with an inert or reducing gas atmosphere, the entire chamber, including the upper plenum, is enclosed in a metal casing 38 to make the structure essentially gas-tight. To prevent oxidation of and to cool the electrical connections within the upper plenum 35, the inert or reducing gas atmosphere is usually fed to the upper plenum 35 from which it passes into the main forming chamber through cracks in the roof structure. This infusion of relatively cool gases through the roof structure is also believed to have a detrimental effect on the problem of drippage from the roof.

Figure 3:
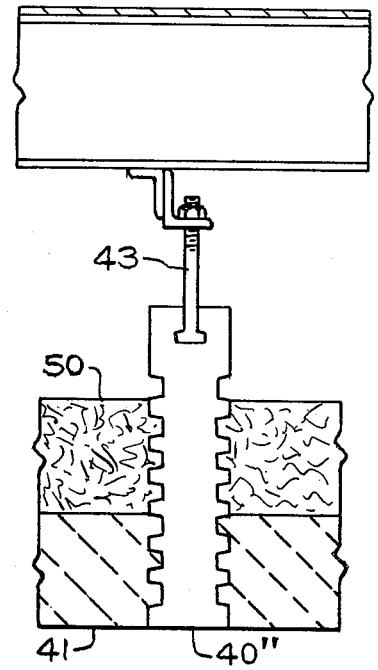
FIG. 3 is yet another alternate embodiment of a hanger arrangement for the float forming chamber of the present invention.
Figure 4:
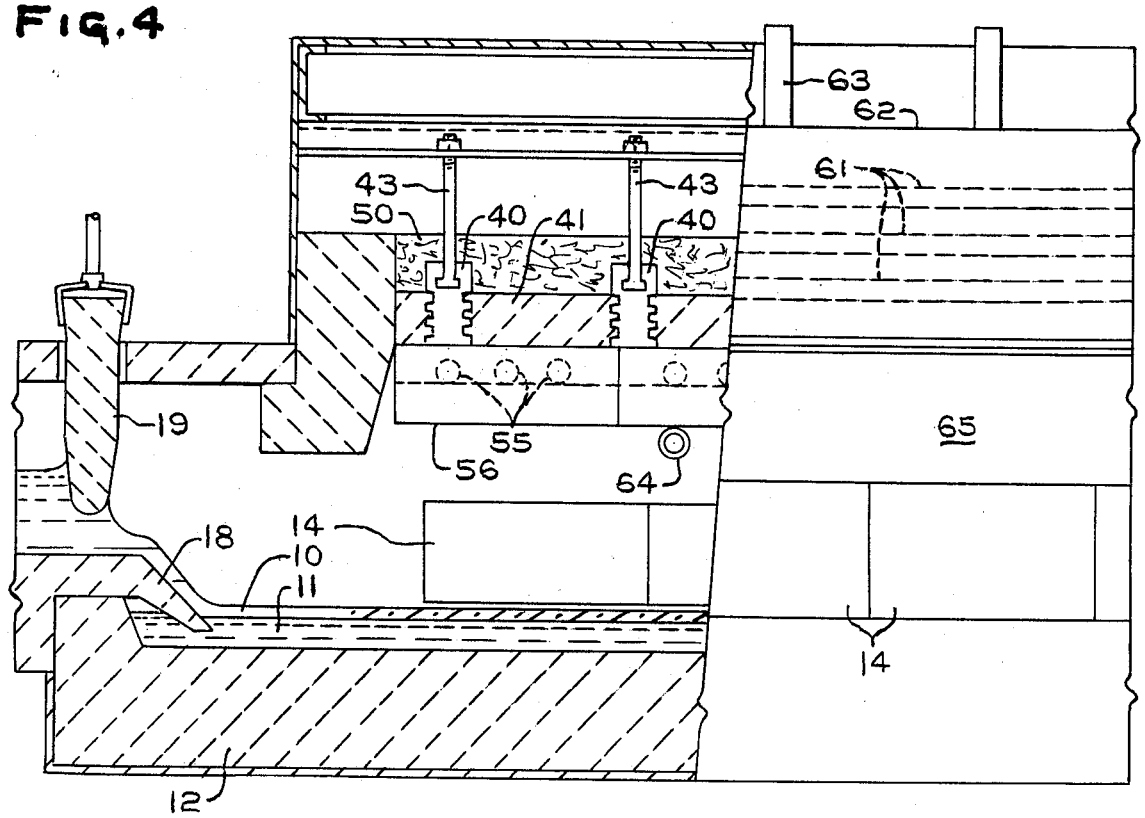
FIG. 4 is a side view, partly broken away, of a preferred embodiment of a float glass forming chamber in accordance with the present invention.

A preferred embodiment of the cast float chamber roof of the present invention may be seen in FIG. 1a and FIG. 4. Also, in the longitudinal cross-section of FIG. 4, there may be seen details of the inlet to the float chamber where molten glass is delivered between a threshold 18 and a metering gate or "tweel" 19 onto the molten metal 11 of the float forming chamber. The novel aspects of the roof include a plurality of refractory anchors 40 about which is cast a refractory material 41 in the form of a flat slab having an essentially horizontal planar bottom surface facing the interior of the float chamber. The anchors 40 are preformed of a ceramic material and have a plurality of lugs 42 projecting from their sides to interlock with the cast material. Each of the anchors 40 is supported from a vertically extending rod 43, the upper end of which is fastened to the superstructure. The anchors may be generally square in a horizontal cross-section, but may take a variety of forms and may be suspended in a number of ways. Two variations are shown in FIGS. 2 and 3.

Figure 2:
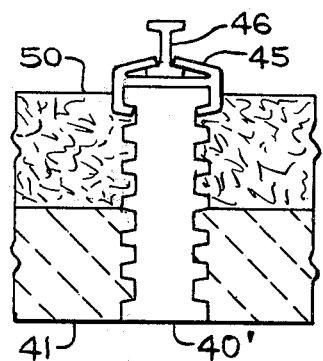
FIG. 2 is a cross-sectional view of an alternate hanger arrangement for the float chamber roof of the present invention.

In FIG. 2, a slightly different form of anchor 40' is engaged at its upper end by a clamping plate 45 which is hung directly from an "I" beam 46 extending across the float chamber a short distance above the roof. This arrangement eliminates the use of vertical hanger rods and minimizes the size of the enclosed space above the roof.

In FIG. 3, another embodiment of anchor is shown which is hung in the same manner as that shown in FIG. 1A and FIG. 4. In FIG. 3 anchor 40", however, is of extended height so that the connection to the hanger rod 43 is exposed within the upper plenum space and is in a relatively cool environment.

The use of cast refractory permits the roof to include joint free sections much larger than those employed in conventional float chamber roofs. However, standard ceramic practice dictates that some joints be provided in the roof to prevent cracking due to non-uniform expansion or contraction during curing or brought on by non-uniform thermal conditions during use. Casting is also most conveniently carried out in sections. Therefore, it is preferred that the roof comprises a plurality of large slabs, each cast around an array of the anchors 40. Typically, each of the slabs may have at least one horizontal dimension on the order of about one meter to two meters and may include about four to sixteen anchors substantially evenly distributed over its area. The actual size of a slab will depend upon the particular castable refractory being used, the geometry and thickness of the slab, and the operating conditions to which the slab will be exposed. An area of at least 1 square meter typically would be feasible.

Castable refractories suitable for use are well-known in the art and are preferably of the type characterized as hydraulic-setting refractory concrete. Desirable characteristics include durability and strength at the operating temperatures to which it will be exposed (up to about 1000° C.) and chemical resistance to the reducing gas atmosphere usually maintained in the forming chamber. Accordingly, the preferred castable refractories have been found to have alumina contents of about 50–70 percent by weight and low iron and sulfur contents. Examples of suitable commercially available castable refractories include those sold under the names "Kaocrete 30" and "Kaocast" (Babcock-Wilcox Co., New York, N.Y.), "Alusa" (Harbison-Walker Refractories, Pittsburgh, PA), and "Purocast" (Kaiser Refractories, Columbiana, Oh.).

It is preferred to reduce heat loss from the float forming chamber by applying a layer of insulating material 50 over the cast refractory 41. This may be an additional ceramic material either castable or preformed, but preferably is a loose material such as a high temperature mineral wool product such as "Kaowool," sold by Babcock-Wilcox Co., New York, New York.

Openings through the cast refractory portion 41 of the roof may be provided for inserting vertically extending heater elements of the type used in the prior art arrangement. However, a preferred arrangement is that depicted in the drawings, wherein horizontally extending heating elements passing through the side walls of the float chamber are employed. This concept constitutes the subject matter of a copending U.S. patent application Ser. No. 195,283 of Ronald L. Schwenninger filed on even date herewith entitled "Float Glass Forming Chamber with Horizontal Heating Elements". The horizontally extending heating elements 55 may be of the same three-legged type for use with three phase power supply conventionally used in the vertical orientation but of longer length. The heating elements 55 pass through the side wall 15 and at their inner ends are supported by a preformed ceramic hanger member 56. The heater hanger 56 extends through the roof of the chamber where its upper end may be engaged by suitable clamping means 57 by which it is provided with vertical support from the overhead superstructure by way of rods 58. The outside end of each leg of the heaters 55 is connected to an electrical cable by means of a clamp 60. Each of the cables, in turn, are connected to a bus bar 61 which, in a preferred embodiment, may extend horizontally along the side of the float chamber. In such an arrangement, the bus bars and electrical connections may be housed within an enclosure 62 extending along the side of the float chamber. The protective non-oxidizing atmosphere for the float chamber may be passed into the enclosure 62 through a conduit 63 and then into the float chamber through a conduit 64 extending through the side wall of the chamber so that the electrical connections may be cooled and protected from oxidation. In this manner, the bulky upper plenum chamber housing the electrical connections in the prior art arrangement has been advantageously eliminated and replaced by the compact, more easily accessible enclosure 62. Eliminating the overhead electrical connections also renders the roof of the float chamber more accessible for servicing and repair and simplifies initial construction.

Side seals 14 are occasionally removed for the insertion of glass stretching devices or other equipment or to perform maintenance. A heat shield 65 is provided on the underside of housing 62 to provide additional thermal protection to the electrical connections during such times when heat is eminating from an open side seal.

A specific, preferred embodiment has been described in detail for the sake of illustrating the invention and for disclosing the best mode, but it should be understood that other variations and modifications as are known to those of skill in the art may be resorted to without departing from the scope of the invention as defined by the claims which follow.

I claim:

1. An apparatus for producing flat glass by the float process comprising: an elongated enclosure adapted to hold a pool of molten metal, means for delivering a stream of molten glass into the enclosure onto the molten metal, and means for drawing the glass along the length of the enclosure and for withdrawing the glass from the enclosure as a formed ribbon; the improvement comprising a substantial portion of the roof of the enclosure being constructed of a plurality of anchor members affixed to support means above the enclosure, and refractory material cast around the anchor members in the form of a substantially horizontally extending slab having a substantially planar bottom surface facing the interior of the enclosure.

2. The apparatus of claim 1 wherein said anchor members are ceramic elements having horizontal projections and are engaged at their upper ends by vertically extending rods.

3. The apparatus of claim 1 wherein each of said slabs is monolithic and has embedded therein at least four of said anchor members.

4. The apparatus of claim 3 wherein said slab has a horizontal dimension of at least 1 meter.

5. The apparatus of claim 4 wherein the slab covers a horizontal area of at least 1 square meter.

6. The apparatus of claim 1 wherein a layer of insulating material overlies the slab.

7. The apparatus of claim 1 wherein a major portion of the area of the roof of the enclosure consists of a plurality of the slabs supported by said anchor members.

* * * * *